(12) United States Patent
Park

(10) Patent No.: US 9,722,435 B2
(45) Date of Patent: Aug. 1, 2017

(54) BATTERY CHARGE BALANCING DEVICE AND BATTERY CHARGE BALANCING SYSTEM

(71) Applicant: SOONGSIL UNIVERSITY RESEARCH CONSORTUM TECHNO-PARK, Seoul (KR)

(72) Inventor: Joung Hu Park, Seoul (KR)

(73) Assignee: SOONGSIL UNIVERSITY RESEARCH CONSCORTUM TECHNO-PARK, Seoul (KR)

( * ) Notice: Subject to any disclaimer, the term of this patent is extended or adjusted under 35 U.S.C. 154(b) by 329 days.

(21) Appl. No.: 14/388,244

(22) PCT Filed: Jan. 25, 2013

(86) PCT No.: PCT/KR2013/000625
§ 371 (c)(1),
(2) Date: Sep. 26, 2014

(87) PCT Pub. No.: WO2013/147412
PCT Pub. Date: Oct. 3, 2013

(65) Prior Publication Data
US 2015/0048794 A1 Feb. 19, 2015

(30) Foreign Application Priority Data

Mar. 29, 2012 (KR) .................. 10-2012-0032297

(51) Int. Cl.
*H02J 7/00* (2006.01)
*H02J 7/34* (2006.01)
*H01M 10/42* (2006.01)

(52) U.S. Cl.
CPC ............ *H02J 7/0014* (2013.01); *H02J 7/007* (2013.01); *H02J 7/0016* (2013.01); *H02J 7/345* (2013.01); *H01M 2010/4271* (2013.01)

(58) Field of Classification Search
CPC ..................................................... H02J 7/0014
(Continued)

(56) References Cited

U.S. PATENT DOCUMENTS 4,238,721 A * 12/1980 DeLuca ................ H02J 7/0016
320/122
5,965,996 A * 10/1999 Arledge ................ H02J 7/0016
320/116

(Continued)

FOREIGN PATENT DOCUMENTS

JP 2008-206396 A 9/2008
JP 2010-098866 A 4/2010
(Continued)

*Primary Examiner* — Samuel Berhanu
*Assistant Examiner* — Tessema Kebede
(74) *Attorney, Agent, or Firm* — Revolution IP, PLLC

(57) ABSTRACT

Disclosed is a battery charge balancing device which includes: a charge-measuring unit that measures charge of a plurality of batteries storing power through a plurality of power converters connected with a plurality of input power sources; a mode-conversion parameter calculating unit that calculates mode conversion parameters for determining mode conversion such that the power converters operate in a power conversion mode for converting power or in a balancing mode for balancing charge between the batteries; and a control unit that controls power transmission path of the power converters by switching a plurality of switches connected between the power converters and the batteries in accordance with the calculated mode conversion parameters.

13 Claims, 5 Drawing Sheets

(58) Field of Classification Search
USPC .......................................................... 320/118
See application file for complete search history.

(56) References Cited

U.S. PATENT DOCUMENTS

| | | | | |
|---|---|---|---|---|
| 6,373,223 | B1* | 4/2002 | Anzawa | H02J 7/0018 320/116 |
| 7,583,056 | B2* | 9/2009 | Chiang | H02J 7/0019 320/118 |
| 8,441,228 | B2* | 5/2013 | Brabec | B60L 11/1861 180/65.21 |
| 8,618,692 | B2* | 12/2013 | Adest | H02J 1/102 307/58 |
| 2004/0135545 | A1* | 7/2004 | Fowler | B60L 11/185 320/118 |
| 2011/0089898 | A1* | 4/2011 | Lee | H02J 7/0016 320/116 |
| 2011/0279085 | A1* | 11/2011 | Shigemizu | H01M 10/441 320/117 |
| 2012/0007558 | A1* | 1/2012 | Pigott | H02J 7/0018 320/118 |
| 2012/0261997 | A1* | 10/2012 | Kang | H02J 1/10 307/80 |

FOREIGN PATENT DOCUMENTS

| | | |
|---|---|---|
| KR | 10-2009-0111571 A | 10/2009 |
| KR | 10-2009-0126794 A | 12/2009 |
| KR | 10-1063057 B1 | 9/2011 |

\* cited by examiner

BATTERY CHARGE BALANCING DEVICE AND BATTERY CHARGE BALANCING SYSTEM

CROSS REFERENCE TO PRIOR APPLICATIONS

This application is a National Stage Application of PCT International Patent Application No. PCT/KR2013/000625 filed on Jan. 25, 2013, under 35 U.S.C. §371, which claims priority to Korean Patent Application No. 10-2012-0032297 filed on Mar. 29, 2012, which are all hereby incorporated by reference in their entirety.

TECHNICAL FIELD

The present invention relates to a battery charge balancing device and a battery charge balancing system, and more particularly, to a technology of balancing the battery unit charge, using a distributed-energy-sourced power converter.

BACKGROUND ART

New renewable energy sources, including a solar cell, have been increasingly concerned recently as an alternative energy in terms of not using limited fossil fuel on earth and minimizing environmental contamination. However, the renewable energy sources have a problem in that it is difficult to stably supply power to loads, because voltage and current are unstable. Accordingly, a technology of stabilizing power output of a system, using an energy storage device such as a battery has been developed in recent years.

In the related art, renewable energy power generation systems had a structure supplying power from a plurality of power sources, using serial power converters. However, since the input power sources are independently provided, the battery charge may be different among the units. A charge balancing circuit (balancing circuit) independent from the power converters is used to prevent a difference in the battery charge.

As a method of balancing the battery charge, although there is a method of balancing battery charge by consuming power with resistors, the efficiency is low. Further, a method of balancing battery charge by using an inductor can increase efficiency, but it is required to additionally connect a power regulator to each of batteries, so the cost of a system increases.

The present invention is based on Korean Patent No. 10-1063057 (Aug. 31, 2011).

DISCLOSURE

Technical Problem

An object of the present invention is to balance unbalanced charge between batteries, using power converters without an extra circuit of balancing circuit during the time without power generation or under specific circumstances, when storing power from an energy source to batteries through the power converters.

Technical Solution

A battery charge balancing device according to an embodiment of the present invention includes: a charge-measuring unit that measures charge of a plurality of batteries storing power through a plurality of power converters connected with a plurality of input power sources; a mode-conversion parameter calculating unit that calculates mode conversion parameters for determining mode conversion such that the power converters operate in a power conversion mode for converting power or in a balancing mode for balancing charge between the batteries; and a control unit that controls power transmission path of the power converters by switching a plurality of switches connected between the power converters and the batteries in accordance with the calculated mode conversion parameter.

Adjacent batteries of the batteries may be connected in series.

When the calculated mode conversion parameters correspond to values for the power conversion mode, the control unit may operate the power converters in the power conversion mode in which the power converters convert power from the input power sources and store the converted power to the batteries.

When the calculated mode conversion parameters correspond to values for the balancing mode, the control unit may operate the power converters in the balancing mode by connecting a first battery of a first power converter with a second power converter and connecting a second battery of the second power converter with a third power converter.

The control unit may charge or discharge the first battery or the second battery by controlling a first closed loop formed by connecting the first battery with the second power converter and a second closed loop formed between the second power converter and the second battery.

The control unit may charge or discharge the second battery or the third battery by controlling a third closed loop formed by connecting the second battery with the third power converter and a fourth closed loop formed between the third power converter and the third battery.

At least one of the first closed loop, the second closed loop, the third closed loop, and the fourth closed loop may be controlled in a duty ratio control method or a frequency control method of a switch.

The first power converter and the second power converter, or the second power converter and the third power converter may be sequentially and repeatedly formed.

Power from the input power source may be cut off, when the power converter operates in the balancing mode.

The mode conversion parameter calculating unit may calculate the mode conversion parameters on the basis of at least one of a charge difference between the batteries, mode conversion time of the power converters, and voltage, current, temperature, and frequency response of the batteries.

A battery charge balancing system according to another embodiment of the present invention includes: an input power source unit that includes a plurality of input power sources; a power converting unit that includes a plurality of power converters converting power from the input power sources; a power-storing unit that includes a plurality of batteries storing converted power; a switching unit that includes a plurality of switches switching connection between the power converters and the power-storing unit; a battery charge balancing device that includes a charge-measuring unit that measures charge of the batteries, a mode-conversion parameter calculating unit that calculates mode conversion parameters for determining mode conversion time such that the power converters operate in a power converting mode for converting power or in a balancing mode for balancing charge between the batteries, and a control unit that controls a power transmission path of the power converters by switching the switching unit in accordance with the calculated mode conversion parameters; and a DC-link connected in parallel at both ends of the batteries connected in series.

Advantageous Effects

According to the present invention, it is possible to balance the unbalanced charge between batteries, using power converters even without an extra circuit of a specific balancing circuit, when storing power from an energy source to the batteries through the power converters. Further, it is possible to reduce the size of the entire system by balancing charge of batteries with power converters, so it is possible to decrease the cost for manufacturing the system.

BEST MODE

Hereinafter, embodiments of the present invention are described with reference to the accompanying drawings. The terms used herein are terms selected in consideration of the functions in the embodiments and their meanings may depend on the intention of users and workers or precedents. Therefore, the meanings of the terms used in the following embodiments follow the definitions, if defined specifically herein, or should be construed as the meanings that those skilled in the art know, if not defined specifically.

Figure 1:
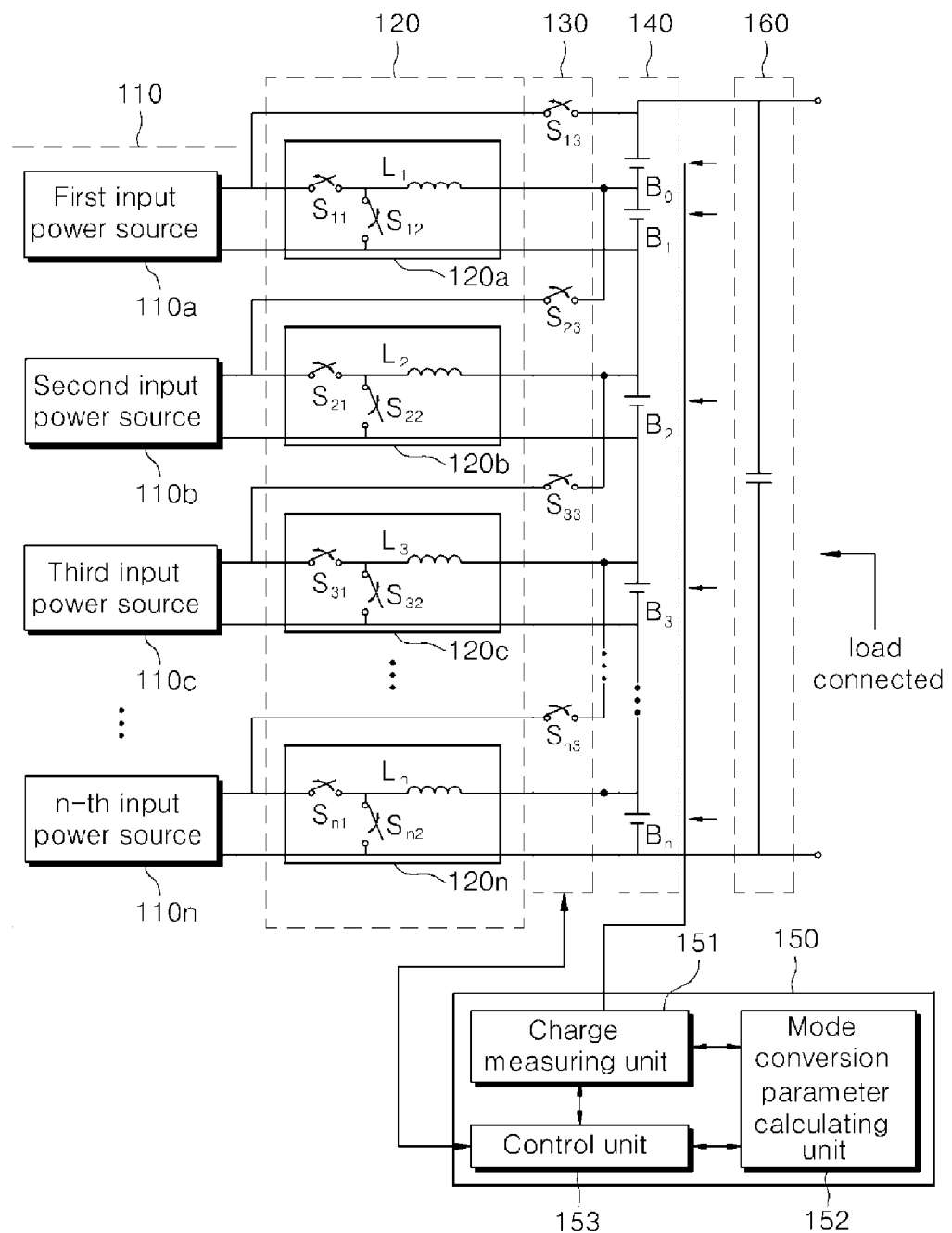
FIG. 1 is a diagram illustrating the configuration of a battery charge balancing system according to an embodiment of the present invention.

FIG. 1 is a diagram illustrating the configuration of a battery charge balancing system according to an embodiment of the present invention.

Referring to FIG. 1, a battery charge balancing system according to an embodiment of the present invention includes an input power source unit 110, a power converting unit 120, a switching unit 130, a power-storing unit 140, a battery charge balancing device 150, and a DC-link 160.

The input power source unit 110 includes a plurality of input power sources $110a$, $110b$, $110c$, ..., $110n$ and an energy source unit that generates power, using solar heat, photovoltaic power generation, biomass, wind power, small hydro power, terrestrial heat, marine energy, waste energy, and fuel cell, coal liquefaction gasification, and hydrogen energy power generation. For example, when a plurality of solar cell modules is used for the input power source unit 110, the solar cell modules are semiconductors using silicon and have a nonlinear output feature of negative incremental impedance as energy supply sources of a solar power generation system by converting solar energy into electricity. Accordingly, since the solar cell modules have a nonlinear feature, there is need of maximum power tracking control.

The power converting unit 120 includes a plurality of power converters $120a$, $120b$, $120c$, ..., $120n$, which are connected to the input power sources $110a$, $110b$, $110c$, ..., $110n$ of the input power source unit 110, respectively. The power converting unit 120 converts power from the input power source unit 110. The power converting unit 120 may include bidirectional converters or unidirectional converters. The power converters $120a$, $120b$, $120c$, ..., $120n$ of the power converting unit 120 basically include a switch element and an inductor, and have an input terminal connected to the input power source unit 110 and an output terminal connected to the power-storing unit 140.

The $120a$, $120b$, $120c$, ..., $120n$ of the power converting unit 120 are connected with upper batteries of a plurality of batteries $B_0$, $B_1$, $B_2$, $B_3$, ..., $B_n$ in the power-storing unit 140 through the switching unit 130 including a plurality of third switches $S_{13}$, $S_{23}$, $S_{33}$, ..., $S_{n3}$. The term 'upper battery' is defined as a relative meaning, and when $B_0$ is set as the uppermost battery and $B_n$ is set as the lowermost battery, the upper most battery $B_0$ is the upper battery of the first battery $B_1$ and the first battery $B_1$ is the upper battery of the second battery $B_2$.

For example, the first power converter $120a$ includes a first switch $S_{11}$, a second switch $S_{12}$, and a first inductor $L_1$. A first terminal of the first switch $S_{11}$ is connected with a first terminal of the first input power source $110a$ and a second terminal of the first switch $S_{11}$ is connected with a first terminal of the first inductor $L_1$. Further, a first terminal of the second switch $S_{12}$ is connected with the second terminal of the first switch $S_{11}$ and the first terminal of the first inductor $L_1$ and a second terminal of the second switch $S_{12}$ is connected with a second terminal of the first input power source $110a$ and a second terminal of the first battery $B_1$. Further, the first terminal of the first inductor $L_1$ is connected with the second terminal of the first switch $S_{11}$ and the first terminal of the second switch $S_{12}$ and the second terminal of the first inductor $L_1$ is connected with a second terminal of the uppermost battery $B_0$, the first terminal of the first battery $B_1$, and a second terminal of the third switch $S_{23}$.

The lower power converters $120b$, $120c$, ..., $120n$ of the first power converter $120a$, which is the uppermost power converter, include components corresponding to the first switch $S_{11}$, the second switch $S_{12}$, and the first inductor $L_1$, and the connection relationships of the components are the same as that of the first power converter $120a$.

The power converters $120a$, $120b$, $120c$, ..., $120n$ of the power converting unit 120 have different power transmission paths, when it operates in a power conversion mode and a balancing mode. The power conversion mode is a mode of converting power from the input power source unit 110 by means of the power converting unit 120 and storing it to the power-storing unit 140 and the balancing mode is a mode of balancing charge between the batteries $B_0$, $B_1$, $B_2$, $B_3$, ..., $B_n$ in the power-storing unit 140 by forming a closed loop between the power converting unit 120 and the power-storing unit 140.

The switching unit 130 includes a plurality of third switches $S_{13}$, $S_{23}$, $S_{33}$, ..., $S_{n3}$ and the switches may be implemented by elements such as MOSFET, BJT, and a relay. The switching unit 130 switches power transmission path in accordance with the operation modes of the power converting unit 120. For example, when the power converting unit 120 is in the power conversion mode, the switching unit 130 is turned off to open, and when the power converting unit 120 is in the balancing mode, the switching unit 130 is turned on and generates a short circuit. When the switching unit 130 is turned on, the input power source unit 110 may be turned off.

For example, a first terminal of the third switch $S_{13}$ connected with the first power converter 120a, of the third switches $S_{13}, S_{23}, S_{33}, \ldots, S_{n3}$ in the switching unit 130 is connected with the first terminal of the first input power source 110a and the first terminal of the first switch $S_{11}$ of the first power converter 120a, and a second terminal of the third switch $S_{13}$ is connected with the first terminal of the uppermost battery $B_0$. Further, a first terminal of the third switch $S_{23}$ connected with the second power converter 120b is connected with the first terminal of the second input power source 110b and the first terminal of the first switch $S_{21}$ of the second power converter 120b, and a second terminal of the third switch $S_{23}$ is connected with the second terminal of the uppermost battery $B_0$ and the first terminal of the first battery $B_1$. The switching unit 130 connects the batteries of the lower power converters and the upper power converters in this way.

The power-storing unit 140 includes a plurality of batteries $B_0, B_1, B_2, B_3, \ldots, B_n$, which is connected with the power converters 120a, 120b, 120c, ..., 120n of the power converting unit 120, respectively, and receives and stores converted power. The batteries $B_0, B_1, B_2, B_3, \ldots, B_n$ are connected in series. Accordingly, the power converters 120a, 120b, 120c, ..., 120n operate as serial power converters. Further, capacitors (not illustrated) may be connected to the batteries $B_0, B_1, B_2, B_3, \ldots, B_n$ in parallel, respectively, and prevent a large current ripple, when the batteries $B_0, B_1, B_2, B_3, \ldots, B_n$ are charged and discharged.

The connection relationship between the power converting unit 120 and the power-storing unit 140 is sequentially repeated. In the battery charge balancing system, the numbers of the power converters 120a, 120b, 120c, ..., 120n and the batteries $B_0, B_1, B_2, B_3, \ldots, B_n$ in the power converting unit 120 and the power-storing unit 140 may be differently set by users.

Further, when the power converting unit 120 operates in the power conversion mode, the uppermost battery $B_0$ does not receive power from the power converter 120, and when the power converting unit 120 operates in the balancing mode, it may be connected with a lower power converter and charged or discharged. The upper power converter and the lower power converter are defined relatively to each other, and for example, the first power converter 120a may be the upper power converter of the second power converter 120b and the third power converter 120c may be the lower power converter of the second power converter 120b.

The third switch connected with the uppermost battery $B_0$ and the first power converter 120a is a selective component in FIG. 1, and when it is not included and the power converters 120a, 120b, 120c, ..., 120n operate in the power conversion mode, all the batteries $B_1, B_2, B_3, \ldots, B_n$ operate to store the power converted by the power converting unit 120. Whereas, when the power converters 120a, 120b, 120c, ..., 120n operate in the balancing mode, the same operation as when the third switch $S_{13}$ connected with the uppermost battery $B_0$ and the first power converter 120a is included can be achieved.

When the power converters 120a, 120b, 120c, ..., 120n are bidirectional converters, the uppermost battery $B_0$ does not need a specific charging/discharging control circuit, but when the power converters 120a, 120b, 120c, ..., 120n are unidirectional converters, the uppermost battery $B_0$ and the n-th battery $B_n$ that is the lowermost battery can only be charged or discharged, so the uppermost battery $B_0$ and the n-th battery $B_n$ that is the lowermost battery may be connected with a specific charging/discharging control circuit (not illustrated) for charging or discharging.

When the power converters 120a, 120b, 120c, ..., 120n are unidirectional converters, it is possible to charge or discharge the uppermost battery $B_0$ and the n-th battery $B_n$ that is the lowermost battery even without connecting a specific charging/discharging control circuit, by using bidirectional power converters for the power converters connected to the uppermost battery $B_0$ and the n-th battery $B_n$ that is the lowermost battery, which are batteries at both ends.

The configuration of the power converters 120a, 120b, 120c, ..., 120n of the power converting unit 120 in the battery charge balancing system according to another embodiment of the present invention may be differently set by users. The power converters 120a, 120b, 120c, ..., 120n may include an additional switch other than the first switch $S_{11}$, the second switch $S_{12}$, and the first inductor $L_1$.

On the other hand, the battery charge balancing device 150 includes a charge-measuring unit 151, a mode-conversion parameter calculating unit 152, and a control unit 153.

The charge-measuring unit 151 measures the charge of the batteries $B_0, B_1, B_2, B_3, \ldots, B_n$ of the power-storing unit 140. As described above, the power converted from the power inputted from the input power sources 110a, 110b, 110c, ..., 110n by the power converters 120a, 120b, 120c, ..., 120n is stored to the batteries $B_0, B_1, B_2, B_3, \ldots, B_n$. For example, when the input power source unit 110 is a solar cell module, the amount of sunlight depends on day and night, summer and winter, or the weather of the day and the maximum power tracked by MPPT (Maximum Power Point Tracking) is stored in the power-storing unit 140 for stable power supply. Accordingly, the charge of power stored in the batteries $B_0, B_1, B_2, B_3, \ldots, B_n$ of the power-storing unit 140 may be unbalanced due to the position and angle of the solar cell module.

The charge-measuring unit 151 measures the power of the batteries $B_0, B_1, B_2, B_3, \ldots, B_n$ connected in series at regular time intervals. For example, the period of measuring power may be set to be relatively short in the daytime with a large amount of sunlight and it may be set to be relatively long in the nighttime with a small amount of or little sunlight. The charge-measuring unit 151 transfers the charge measuring unit of the batteries $B_0, B_1, B_2, B_3, \ldots, B_n$ to the mode-conversion parameter calculating unit 152.

The mode-conversion parameter calculating unit 152 calculates the mode conversion parameters for determining if the mode is converted into the power conversion mode in which the power converters 120a, 120b, 120c, ..., 120n convert the power or into the balancing mode in which they balance the charge between batteries. In this case, the mode conversion parameters may be set on the basis of voltage differences between the batteries $B_0, B_1, B_2, B_3, \ldots, B_n$, or the mode conversion time of the power converters 120a, 120b, 120c, ..., 120n, and the voltage, current, temperature, and frequency response of the batteries $B_0, B_1, B_2, B_3, \ldots, B_n$, but they are not limited thereto.

For example, when the input power source unit 110 is a solar module, since a solar cell generates power in daytime, the mode-conversion parameter calculating unit 152 can set the mode conversion parameters such that the power converting unit 120 operates in the power conversion mode. Whereas, when the solar cell does not generate power in nighttime, the mode-conversion parameter calculating unit can set the mode conversion parameters such that the power converting unit 120 operates in the balancing mode. However, those settings may be changed by users and it is possible to set the mode conversion parameters such that the power converting unit 120 operates in the balancing mode even in the daytime when the solar cell generates power.

For example, the mode-conversion parameter calculating unit 152 determines whether the voltage differences between the batteries $B_0, B_1, B_2, B_3, \ldots, B_n$ are out of a predetermined voltage difference range. The voltage difference tolerance range may be set in advance in the mode-conversion parameter calculating unit 152. Further, the mode-conversion parameter calculating unit 152 can determine a voltage difference on the basis of the average voltage of the power-storing unit 140 inputted from the charge-measuring unit 151. Further, it is possible to compare and determine voltage differences between the batteries $B_0, B_1, B_2, B_3, \ldots, B_n$ on the basis of a predetermined voltage difference range. The mode-conversion parameter calculating unit 152 outputs results of the voltage differences between the batteries $B_0, B_1, B_2, B_3, \ldots, B_n$ to the control unit 153.

The control unit 153 switches the power transmission path of the power converting unit 120 by controlling the switching unit 150 such that the power converting unit 120 operates in the power conversion mode in which it converts the power of the input power source unit 110 in accordance with result of mode conversion parameter calculated in mode-conversion parameter calculation unit 152 and stores it in the power-storing unit 140 or in the balancing mode in which the power converting unit 120 balances the charge of the power-storing unit 140.

That is, the power converting unit 120 can turn off the third switches $S_{13}, S_{23}, S_{33}, \ldots, S_{n3}$ in the switching unit 150 in the power conversion mode. Also it can turn on the third switches $S_{13}, S_{23}, S_{33}, \ldots, S_{n3}$ in the switching unit 150 in the balancing mode. When the power converting unit 120 operates in the balancing mode, inflow of power to the power converting unit 120 from the input power source unit 110 may be cut off. For example, diodes may be connected in series to the input power sources 110a, 110b, 110c, ..., 110n of the input power source unit 110, respectively, and when the switching unit 150 is turned on, reverse bias is applied to the diodes by the charge of the batteries $B_0, B_1, B_2, B_3, \ldots, B_n$ in the power-storing unit 140 and the input power source unit 110 is turned off.

Further, the control unit 153 can individually control the third switches $S_{13}, S_{23}, S_{33}, \ldots, S_{n3}$ in the switching unit 150. For example, when there is charge imbalance between the batteries $B_0$ and $B_1$ of the batteries $B_0, B_1, B_2, B_3, \ldots, B_n$ in daytime, it is also possible to balance the charge between the batteries $B_0$ and $B_1$ by controlling only the corresponding power converter 120a and the third switch $S_{13}$.

Further, when the power converting unit 120 is operated in the balancing mode, the control unit 153 turns on the third switches $S_{13}, S_{23}, S_{33}, \ldots, S_{n3}$ in the switching unit 130. In this case, the inductors $L_1, L_2, L_3, \ldots, L_n$ of the power converters 120a, 120b, 120c, ..., 120n, the third switches $S_{13}, S_{23}, S_{33}, \ldots, S_{n3}$ of the switching unit 150, and the upper batteries $B_0, B_1, B_2, B_3, \ldots, B_{n-1}$ are connected and make the first closed loop, and the inductors $L_1, L_2, L_3, \ldots, L_n$, the second switches $S_{12}, S_{22}, S_{32}, \ldots, S_{n2}$, and the lower batteries $B_1, B_2, B_3, \ldots, B_n$ are connected and make the second closed loop.

In this case, the upper batteries $B_0, B_1, B_2, B_3, \ldots, B_{n-1}$ and the lower batteries $B_1, B_2, B_3, \ldots, B_n$ which are controlled through the first closed loop and the second closed loop are complementarily charged or discharged. For example, when the charge of the first battery $B_1$ in the first closed loop is higher than the charge of the second battery $B_2$ in the second closed loop, the first closed loop and the second closed loop are complementarily controlled such that the first closed loop discharges the first battery $B_1$ and the second closed loop charges the second battery $B_2$ with the power discharged from the first battery $B_1$.

The first closed loop is a closed loop that is newly formed while the power converting unit 120 changes from the power conversion mode into the balancing mode and is connected with the power-storing unit 140 and the second closed loop is a closed loop that is formed while the power converting unit 120 is connected with the power-storing unit 140 regardless of the power conversion mode or the balancing mode. Although only the first closed loop and the second closed loop were described above for the convenience of description, the first closed loop and the second closed loop are described hereafter extensively to a third closed loop and a fourth closed loop, respectively.

For example, when the closed loop formed between the first power converter 120a and the uppermost battery $B_0$ is set as the first closed loop and the closed loop formed between the first power converter 120a and the first battery $B_1$ is set as the second closed loop, the closed loop formed between the second power converter 120b and the first battery $B_1$ is set as a third closed loop and the closed loop formed between the second power converter 120b and the second battery $B_2$ is set as a fourth closed loop. The names of the closed loops may be changed in relative conception.

The DC-link 160 is connected in parallel to both ends of the batteries $B_0, B_1, B_2, B_3, \ldots, B_n$ connected in series. The DC-link 160, which is a node for supplying DC voltage to the rear ends, may be connected with an inverter (not illustrated) for supplying AC power at a load terminal (not illustrated) or connected with various AC/DC converters for DC load.

Figure 2:
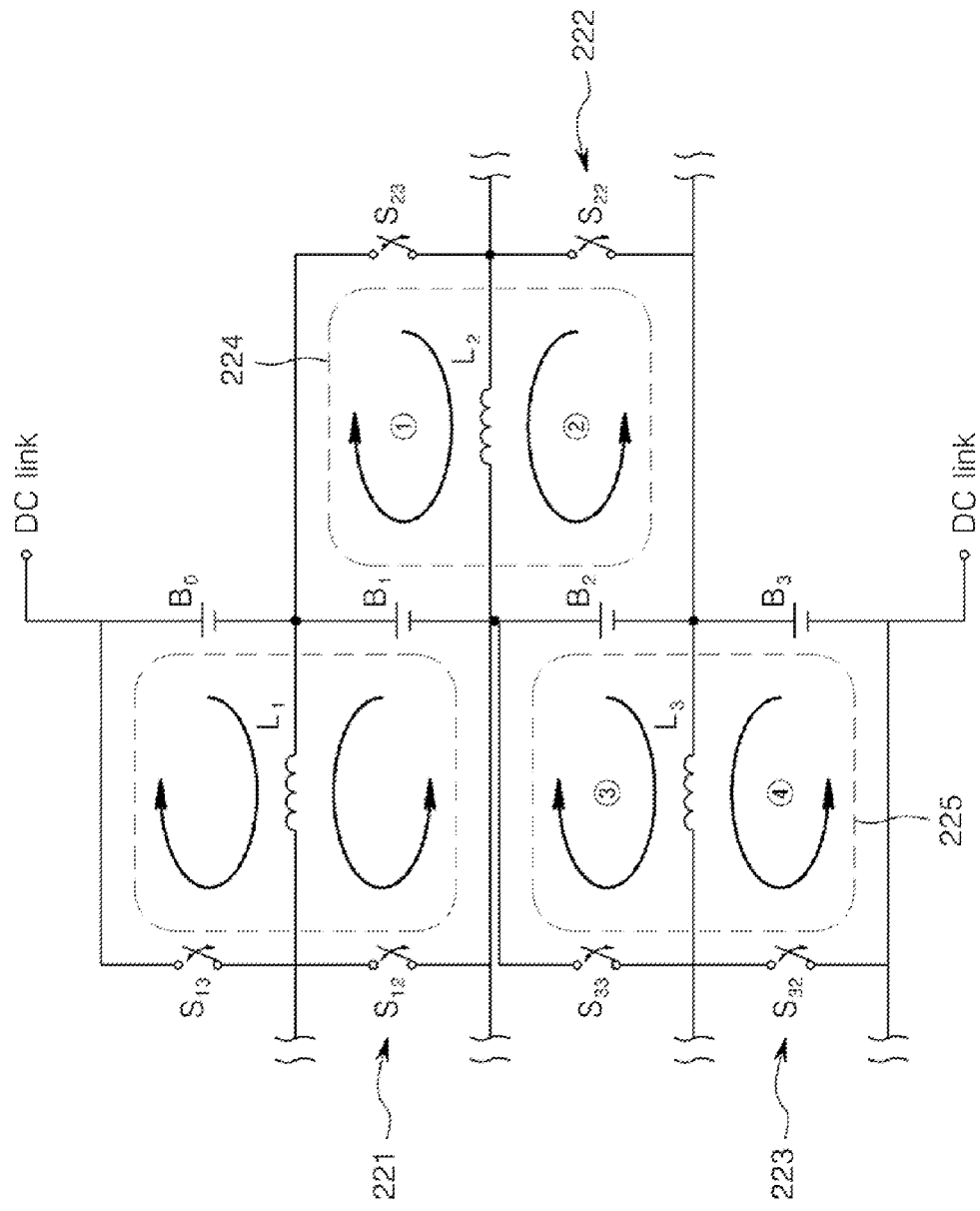
FIG. 2 is an equivalent circuit diagram for illustrating balancing of the battery charge, using bidirectional power converters in the battery charge balancing system illustrated in FIG. 1.

FIG. 2 is an equivalent circuit diagram for illustrating balancing of battery charge, using a bidirectional power converter in the battery charge balancing system illustrated in FIG. 1.

Referring to FIG. 2, the operation in a balancing mode of a battery charge balancing system including three power converters 221, 222, 223 and four batteries $B_0, B_1, B_2, B_3$ is illustrated. In this case, the uppermost $B_0$ to the third batteries $B_3$ are connected in series and the power converters 221, 222, 223 are connected with the batteries of the upper power converters through the third switches $S_{13}, S_{23}, S_{33}$ of the switching unit.

For example, the first terminal of the first inductor $L_1$ of the first power converter 221 is connected with the first terminal of the third switch $S_{13}$, the second terminal of the third switch $S_{13}$ is connected with the first terminal of the uppermost battery $B_0$, and the second terminal of the uppermost battery $B_0$ is connected with the second terminal of the first inductor $L_1$, thereby forming a closed loop. Further, the first terminal of the first inductor $L_1$ is connected with the first terminal of the second switch $S_{12}$, the second terminal of the second switch $S_{12}$ is connected with the second terminal of the first battery $B_1$, and the first terminal of the first battery $B_1$ is connected with the second terminal of the first inductor $L_1$, thereby forming a closed loop.

For example, the first terminal of the second inductor $L_2$ of the second power converter 222 is connected with the first terminal of the third switch $S_{23}$, the second terminal of the third switch $S_{23}$ is connected with the first terminal of the first battery $B_1$, and the second terminal of the first battery $B_1$ is connected with the second terminal of the second inductor $L_2$, thereby forming a first closed loop ①. Further, the first terminal of the second inductor $L_2$ is connected with the first terminal of the second switch $S_{22}$, the second terminal of the second switch $S_{22}$ is connected with the second terminal of the second battery $B_2$, and the first terminal of the second battery $B_2$ is connected with the second terminal of the second inductor $L_2$, thereby forming a second closed loop ②. Accordingly, a set of closed loops 224 is formed.

On the other hand, the first terminal of the third inductor $L_3$ of the second power converter 223 is connected with the first terminal of the third switch $S_{33}$, the second terminal of the third switch $S_{33}$ is connected with the first terminal of the second battery $B_2$, and the second terminal of the second battery $B_2$ is connected with the second terminal of the third inductor $L_3$, thereby forming a third closed loop ③. Further, the first terminal of the third inductor $L_3$ is connected with the first terminal of the second switch $S_{32}$, the second terminal of the second switch $S_{32}$ is connected with the second terminal of the third battery $B_3$, and the first terminal of the third battery $B_3$ is connected with the second terminal of the third inductor $L_3$, thereby forming a fourth closed loop ④. Accordingly, a set of closed loops 225 is formed.

In FIG. 2, the first closed loop ① discharges the first battery $B_1$ and stores the discharged power in the second inductor $L_2$, when the third switch $S_{23}$ is turned on. Further, the second closed loop ② charges the second battery $B_2$ with the power stored in the second inductor $L_2$, when the second switch $S_{22}$ is turned on. Of course, the inductor current direction can be reversed, but anyway the first closed loop ① and the second closed loop ② have complementary power flow.

Further, the third closed loop ③ charges the second battery $B_2$ with the power stored in the third inductor $L_3$, when the third switch $S_{33}$ is turned on. Further, the fourth closed loop discharges the third battery $B_3$ and stores the discharged power to the third inductor $L_3$, when the second switch $S_{32}$ is turned on. As described above, the third closed loop ③ and the fourth closed loop ④ have complementary power flow. The duty ratio or the frequency of the switches may be differently set by users.

The closed loop set 224 of the first closed loop ① and the second closed loop ② and the closed loop set 225 of the third closed loop ③ and the fourth closed loop ④ may be individually controlled. For example, when the charge between the second battery $B_2$ and the third battery $B_3$ is unbalanced, the charge is balanced by controlling the closed loop set 225 of the third closed loop ③ and the fourth closed loop ④, and then when the charge between the second battery $B_2$ and the first battery $B_1$ is unbalanced, the charge is balanced by controlling the durations of the closed loop set 224 of the first closed loop ① and of the second closed loop ②. Accordingly, charge is sequentially balanced from the third battery $B_3$ to the uppermost battery $B_0$. When the power flow in the closed loop illustrated in FIG. 2 is opposite, charge may be sequentially balanced from the uppermost battery $B_0$ to the third battery $B_3$.

Figure 3:
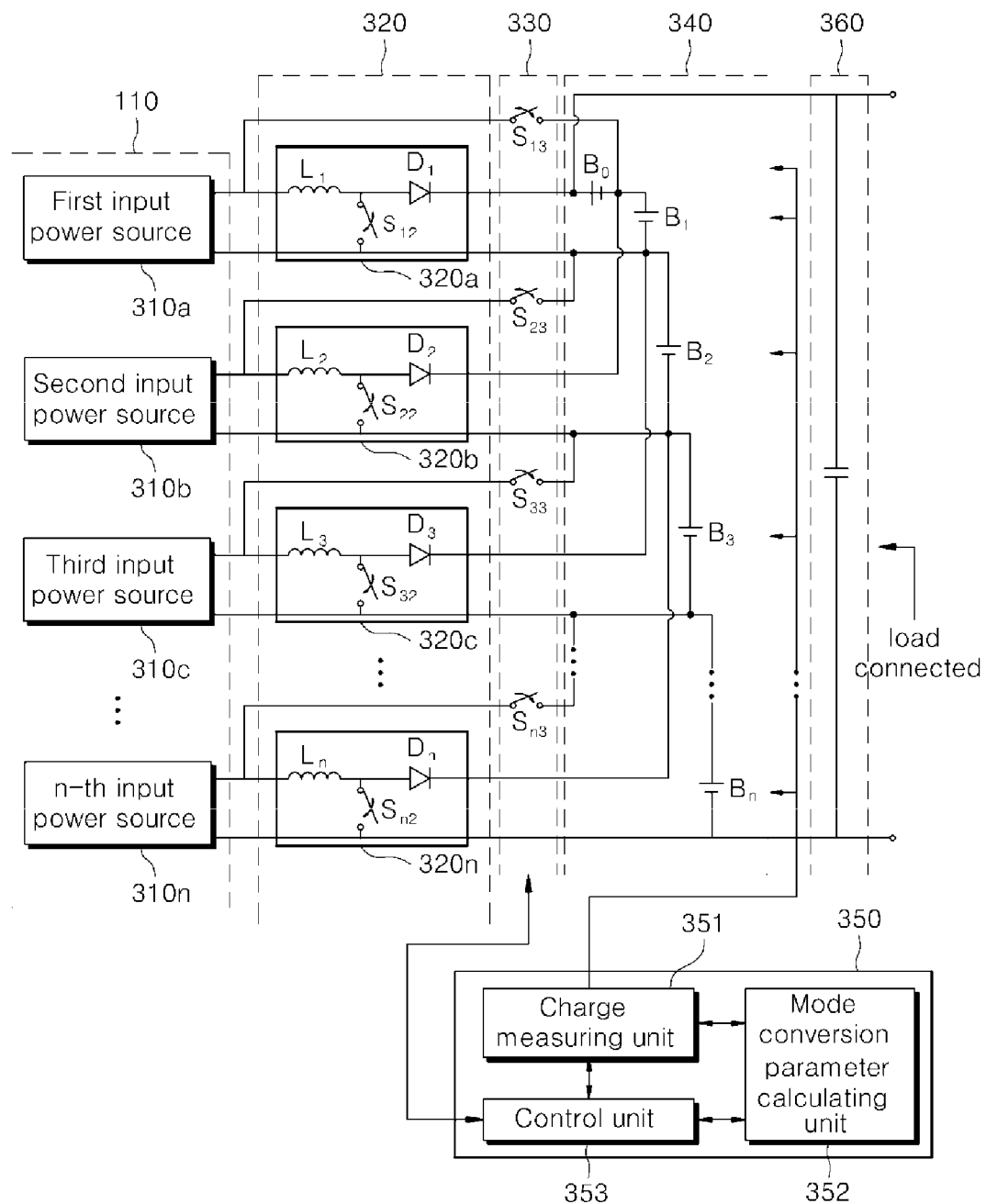
FIG. 3 is a diagram illustrating the configuration of a battery charge balancing system according to another embodiment of the present invention.

FIG. 3 is a diagram illustrating the configuration of a battery charge balancing system according to another embodiment of the present invention.

Referring to FIG. 3, the battery charge balancing system of FIG. 3 includes: an input power source unit 310 including a plurality of input power sources 310a, 310b, 310c, ..., 310n; a power converting unit 320 including a plurality of power converters 320a, 320b, 320c, ..., 320n; a switching unit 330 including a plurality of switches $S_{13}$, $S_{23}$, $S_{33}$, ..., $S_{n3}$; a power-storing unit 340 including a plurality of batteries $B_0$, $B_1$, $B_2$, $B_3$, ..., $B_n$ storing power converted by the power converting unit 320; a charge balancing device 350 controlling power converting unit 320 to operate in a power conversion mode or a balancing mode by controlling the switching unit 330; and a DC-link 360 that is a node for supplying DC charge to the rear end.

In the battery charge balancing system illustrated in FIG. 3, the power converters 320a, 320b, 320c, ..., 320n of the power converting unit 320 are unidirectional converters, and the power converters 320a, 320b, 320c, ..., 320n include inductors $L_1$, $L_2$, $L_3$, ... $L_n$, switches $S_{12}$, $S_{22}$, $S_{32}$, ..., $S_{n2}$, and diodes $D_1$, $D_2$, $D_3$, ... $D_n$.

The charge balancing device 350 includes a charge-measuring unit 351, a mode-conversion parameter calculating unit 352, and a control unit 353 and the basic operations are the same as those of the charge balancing device 150 illustrated in FIG. 1. The control unit 353 turns off the switches $S_{13}$, $S_{23}$, $S_{33}$, ..., $S_{n3}$ to operate the power converting unit 320 in the power conversion mode. Whereas, it turns on the switches to operate the power converting unit in the balancing mode.

The first terminal of the inductor $L_1$ of the first power converter 320a is connected with the first terminal of the first input power source 310a and the second terminal of the inductor $L_1$ is connected with the first terminal of the switch $S_{12}$ and the first terminal of the first diode $D_1$. The second terminal of the first diode $D_1$ is connected with the first terminal of the uppermost battery $B_0$, and also the second terminal of the uppermost battery $B_0$ is connected with the first terminal of the first battery $B_1$. Further, the second terminal of the first battery $B_1$ is connected with the second terminal of the switch $S_{12}$, the first terminal of the second battery $B_2$, and the first terminal of the third switch $S_{23}$ of the switching unit 330. Since the third switches $S_{13}$, $S_{23}$, $S_{33}$, ..., $S_{n3}$ in the switching unit 330 switch the contact points between the input terminals of the power converters 320a, 320b, 320c, ..., 320n and the batteries $B_0$, $B_1$, $B_2$, $B_3$, ..., $B_n$, the charge between the batteries $B_0$, $B_1$, $B_2$, $B_3$, ..., $B_n$ can be balanced.

The switch $S_{n3}$ connected with the lowermost battery $B_n$ and the n-th power converter 320n is a selective component in FIG. 3, and when it is not included and the power converters 320a, 320b, 320c, ..., 320n operate in the power conversion mode, all the batteries $B_1$, $B_2$, $B_3$, ..., $B_{n-1}$ operate to store the power converted by the power converting unit 320. Further, when the power converters 320a, 320b, 320c, ..., 320n operate in the balancing mode, the same operation as when the switch $S_{n3}$ is connected with the lowermost battery $B_n$ and the n-th power converter 320n is included, can be achieved.

Figure 4:
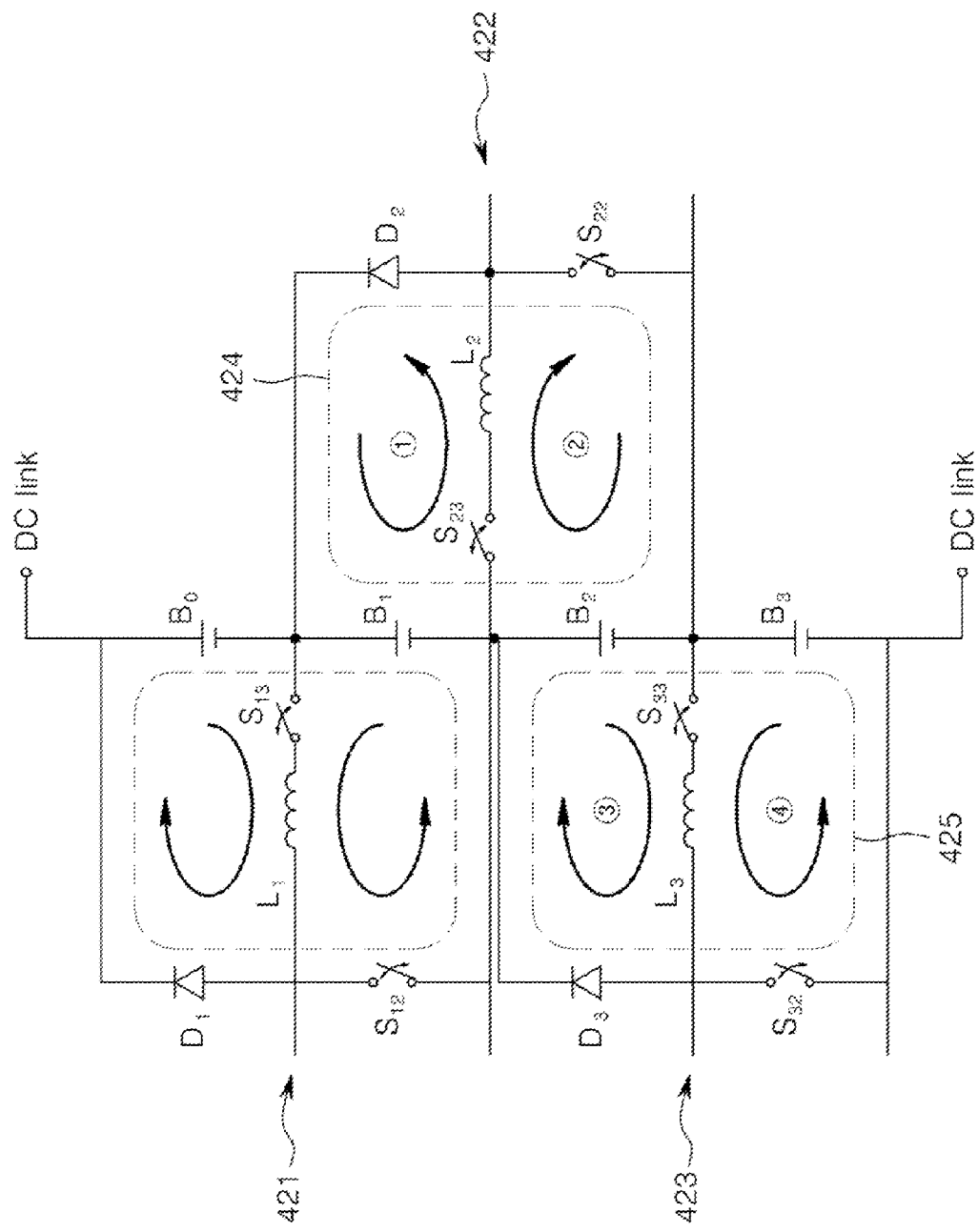
FIGS. 4 and 5 are equivalent circuit diagrams for illustrating balancing of battery charge, using unidirectional power converters in the battery charge balancing system illustrated in FIG. 3.
Figure 5:
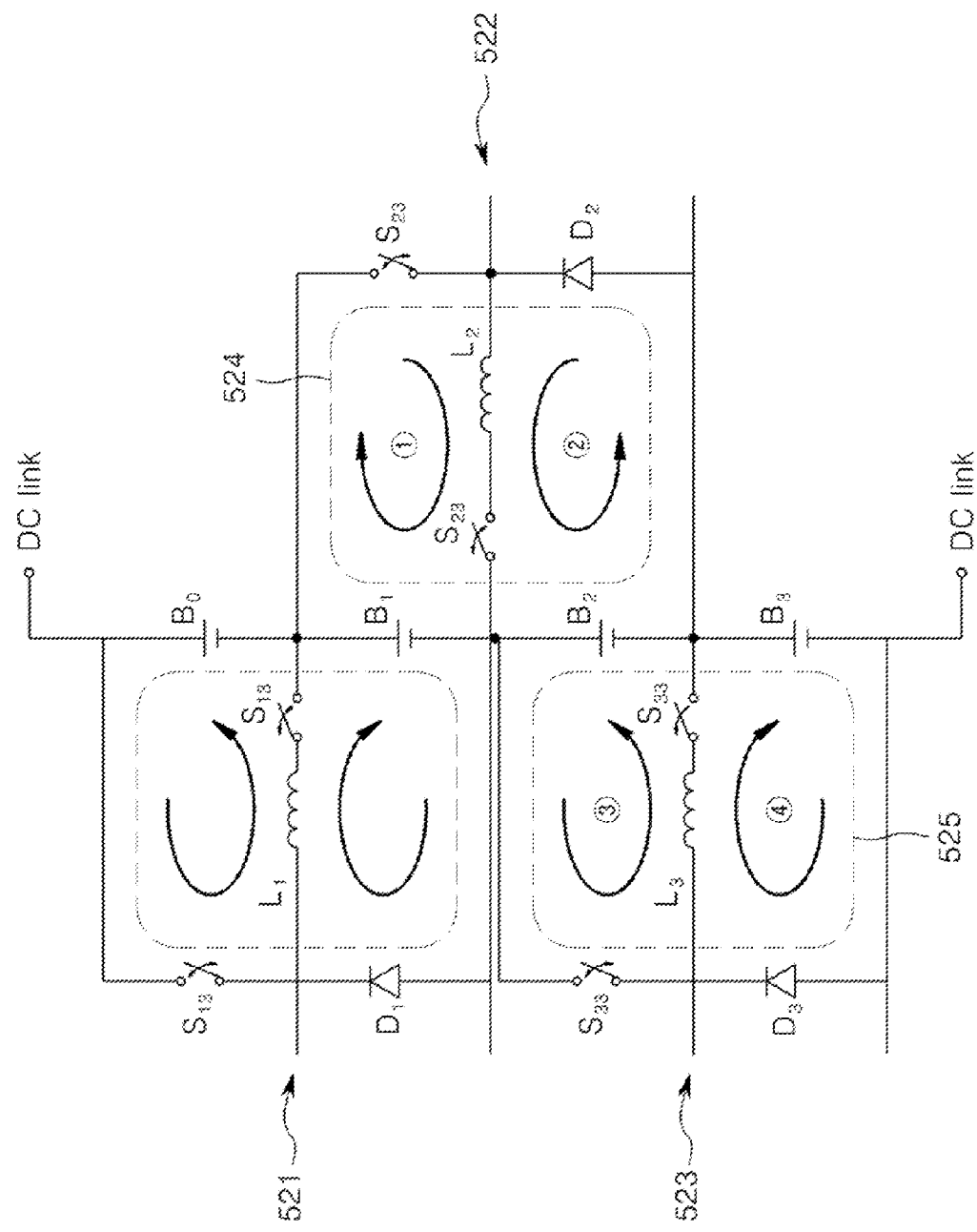

FIGS. 4 and 5 are equivalent circuit diagrams for illustrating balancing of the battery charge, using unidirectional power converters in the battery charge balancing system illustrated in FIG. 3.

FIG. 4, similar to FIG. 2, illustrates the operation of a battery charge balancing system including three power converters 421, 422, 423 and four batteries $B_0$, $B_1$, $B_2$, $B_3$ in a balancing mode. In this case, the uppermost battery $B_0$ to the third battery $B_3$ are connected in series, the power converters 421, 422, 423 are connected with upper batteries, and the connection relationships are the same as those illustrated in FIG. 2. However, the power converters 421, 422, 423 and the batteries $B_0$, $B_1$, $B_2$, $B_3$ to be newly connected in the balancing mode are connected by switches $S_{12}$, $S_{13}$, $S_{22}$, $S_{23}$, $S_{32}$, $S_{33}$ or diodes $D_1$, $D_2$, $D_3$.

In FIG. 4, upper batteries are charged by discharging lower batteries with the unidirectional power converters 421, 422, 423 and the power flow direction is set upward. In this case, the closed loop sets 424 and 425 may individually operate. For example, the third battery $B_3$ of the third power converter 423 is discharged through the fourth loop ④ CD and the second battery $B_2$ is charged through the third loop ③. Next, the second battery $B_2$ is discharged through the second loop ② and the first battery $B_1$ is charged through the first loop ①. In this way, even the uppermost battery $B_0$ can be charged.

Further, when the unidirectional power converters 421, 422, 423 are used, the uppermost battery $B_0$ of the batteries $B_0$, $B_3$ at both ends can only be charged and the third battery $B_3$ that is the lowermost battery can only be discharged. Accordingly, it is possible to control complementary charging/discharging between the batteries $B_0$, $B_3$ by adding a specific charging/discharging circuit (not illustrated) between the uppermost battery $B_0$ and the third battery $B_3$.

When the power converters 421, 422, 423 are unidirectional converters, it is possible to charge or discharge the uppermost battery $B_0$ and the n-th battery $B_1$, that is the lowermost battery even without connecting a specific charging/discharging control circuit, by using bidirectional power converters for the power converters connected to the uppermost battery $B_0$ and the third battery $B_3$ that is the lowermost battery, which are batteries at both ends.

FIG. 5, similar to FIG. 2, illustrates setting of power flow to the downward direction by charging lower batteries and by discharging upper batteries, using unidirectional power converters having another topology in a battery charge balancing system including three power converters 521, 522, 523 and four batteries $B_0$, $B_1$, $B_2$, $B_3$. According to this method, as illustrated in FIG. 4, batteries connected with diodes $D_1$, $D_2$, $D_3$ are charged by controlling the closed loop including the diodes, and also the batteries connected with switches $S_{13}$, $S_{23}$, $S_{33}$ are discharged by controlling the closed loop including the switches. For example, the first battery $B_1$ is charged by discharging the uppermost battery $B_0$ and the second battery $B_2$ is charged by discharging the first battery $B_1$, thereby charging the third battery $B_3$. In this case, the closed loop sets 524 and 525 may individually operate.

As compared with FIG. 4, the positions of the switches $S_{12}$, $S_{22}$, $S_{32}$ and the diodes $D_1$, $D_2$, $D_3$ in the closed loops are different. When the diodes $D_1$, $D_2$, $D_3$ in FIG. 5 are set in opposite directions, the power flow may be set upward, as in FIG. 4.

Further, when unidirectional power converters are used, the uppermost battery $B_0$ in the battery stack $B_0$, $B_3$ can be discharged only, whereas the third battery $B_3$ that is the lowermost battery can be charged only. Accordingly, it is possible to control complementary charging/discharging between the batteries $B_0$, $B_3$ by adding a specific charging/discharging circuit (not illustrated) between the uppermost battery $B_0$ and the third battery $B_3$.

According to the embodiments of the present invention, it is possible to balance the unbalanced charge between batteries, using power converters even without an extra balancing circuit, when storing the power generated from an energy source to the batteries through the power converters. Therefore, it is possible to reduce the size of the entire system by balancing charge of batteries without extra power converters, so it is possible to decrease the cost for manufacturing the system.

Although the present invention has been described on the basis of the embodiments described with reference to the drawings, it is not limited thereto. Therefore, the present invention should be construed on the basis of claims intended for including modifications that can be achieved apparently from the embodiments.

The invention claimed is:

1. A battery charge balancing device, comprising:
a charge-measuring unit measuring charge of a plurality of batteries storing power through a plurality of power converters connected with a plurality of input power sources, the batteries comprising at least one of a first, a second, and a third battery, and the power converters comprising at least one of a first, a second, and a third power converter;
a mode-conversion parameter calculating unit calculating mode conversion parameters for determining whether to operate a power conversion mode or a balancing mode, the power conversion mode activating the power converters to convert power from the input power sources and to store the converted power to the batteries and the balancing mode balancing charge between the batteries in a manner complementary charging and discharging between the batteries; and
a control unit controlling power transmission path of the power converters by switching a plurality of switches connected between the power converters and the batteries in accordance with the calculated mode conversion parameters, wherein
the control unit selectively operates to activate the power conversion mode or to activate the balancing mode according to the calculated conversion parameters depending on whether or not the conversion parameters corresponding to the power conversion mode or corresponding to the balancing mode and wherein the selective operation by the control unit associated with whether activating the power conversion mode or the balancing mode further comprises:
in response to detection of the calculated mode conversion parameters corresponding to parameters for the power conversion mode, the control unit, by controlling the switches, operates the power converters in the power conversion mode in which the power converters convert power from the input power sources and store the converted power to the batteries;
in response to detection of the calculated mode conversion parameters corresponding to parameters for the balancing mode, the control unit, by controlling the switches, operates the power converters in the balancing mode by connecting the first battery of the first power converter with the second power converter and connecting the second battery of the second power converter with the third power converter.

2. The device of claim 1, wherein the first, the second, and the third battery are connected in series.

3. The device of claim 1, wherein power from the input power source is cut off in response to detection of the balancing mode of the power converters.

4. The device of claim 1, wherein the mode-conversion parameter calculating unit calculates the mode conversion parameters on the basis of at least one of a charge difference between the batteries, mode conversion time of the power converters, and voltage, current, temperature, and frequency response of the batteries.

5. The device of claim 1, wherein the control unit charges or discharges the first battery or the second battery by controlling a first closed loop formed by connecting the first battery with the second power converter and a second closed loop formed between the second power converter and the second battery.

6. The device of claim 1, wherein the control unit charges or discharges the second battery or the third battery by controlling a third closed loop formed by connecting the second battery with the third power converter and a fourth closed loop formed between the third power converter and the third battery.

7. The device of claim 1, wherein at least one of the first closed loop, the second closed loop, the third closed loop, and the fourth closed loop is controlled in a duty ratio control method or a frequency control method of a switch.

8. The device of claim 5, wherein at least one of the first closed loop, the second closed loop, the third closed loop, and the fourth closed loop is controlled in a duty ratio control method or a frequency control method of a switch.

9. The device of claim 6, wherein at least one of the first closed loop, the second closed loop, the third closed loop, and the fourth closed loop is controlled in a duty ratio control method or a frequency control method of a switch.

10. The device of claim 1, wherein the first power converter and the second power converter, or the second power converter and the third power converter are sequentially and repeatedly formed.

11. The device of claim 5, wherein the first power converter and the second power converter, or the second power converter and the third power converter are sequentially and repeatedly formed.

12. The device of claim 6, wherein the first power converter and the second power converter, or the second power converter and the third power converter are sequentially and repeatedly formed.

13. A battery charge balancing system comprising:
an input power source unit including a plurality of input power sources;
a power converting unit including a plurality of power converters converting power from the input power sources, the power converters comprising at least one of a first, a second, and a third power converter;
a power-storing unit including a plurality of batteries storing converted power;
a switching unit including a plurality of switches switching the connections between the power converters and the power-storing units;
a battery charge balancing device including a charge-measuring unit configured to measure charge of the batteries comprising at least one of a first, a second, and a third battery;
a mode-conversion parameter calculating unit configured to calculate mode conversion parameters for determining whether to operate a power conversion mode or a balancing mode, the power conversion mode activating the power converters to convert power from the input power sources and to store the converted power to the batteries and the balancing mode balancing charge between the batteries in a manner complementary charging and discharging between the batteries;
a control unit configured to control a power transmission path of the power converters by switching the switching unit in accordance with the calculated mode conversion parameters; and
a DC-link connected in parallel at both ends of the batteries connected in series, wherein the control unit selectively operates to activate the power conversion mode or to activate the balancing mode according to the calculated conversion parameters depending on whether or not the conversion parameters corresponding to the power conversion mode or corresponding to the balancing mode, and wherein the selective operation by the control unit associated with whether activating the power conversion mode or the balancing mode further comprises:
in response to detection of the calculated mode conversion parameters corresponding to parameters for the power conversion mode, the control unit, by controlling the switches, operates the power converters in the power conversion mode in which the power converters convert power from the input power sources and store the converted power to the batteries;
in response to detection of the calculated mode conversion parameters corresponding to parameters for the balancing mode, the control unit, by controlling the switches, operates the power converters in the balancing mode by connecting the first battery of the first power converter with the second power converter and connecting the second battery of the second power converter with the third power converter.

* * * * *